United States Patent
Ferguson

[15] 3,668,789
[45] June 13, 1972

[54] TEACHING AID FOR RETARDED CHILDREN

[72] Inventor: Jean Ferguson, 721 South Green Street, Apt. 223, Longview, Tex. 75601

[22] Filed: Dec. 4, 1970

[21] Appl. No.: 95,281

[52] U.S. Cl. ................................................. 35/9 E
[51] Int. Cl. ............................................... G09b 3/02
[58] Field of Search ............... 35/9 R, 9 E, 35 D, 35 H, 69

[56] References Cited

UNITED STATES PATENTS

| | | |
|---|---|---|
| 1,641,982 | 9/1927 | McDade ........................... 35/9 E X |
| 2,628,435 | 2/1953 | Minninger ......................... 35/35 H |
| 2,855,703 | 10/1958 | Stanton ............................ 35/9 R X |
| 3,181,252 | 5/1965 | Goldschmidt ..................... 35/9 R |

*Primary Examiner*—Harland S. Skogquist
*Attorney*—A. Yates Dowell and A. Yates Dowell, Jr.

[57] ABSTRACT

An apparatus to aid in teaching retarded children which utilizes word association cards and offers rewards for correct answers. The proper identification of a word or a picture by a student results in the student's receipt of a token which will be exchanged for a reward. The student is further rewarded by being allowed to move an indicator to a position adjacent a different word association card after each correct answer.

5 Claims, 10 Drawing Figures

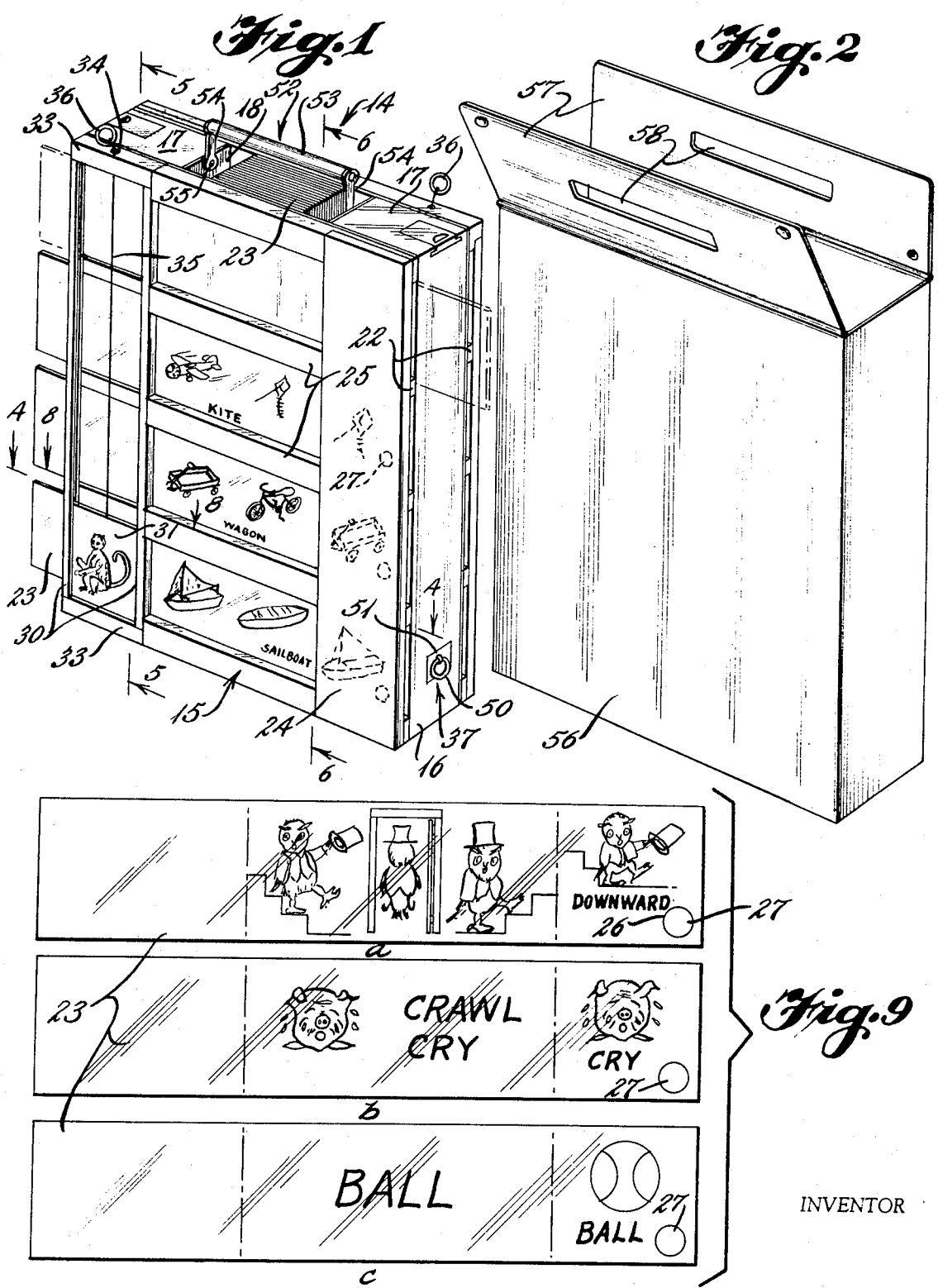

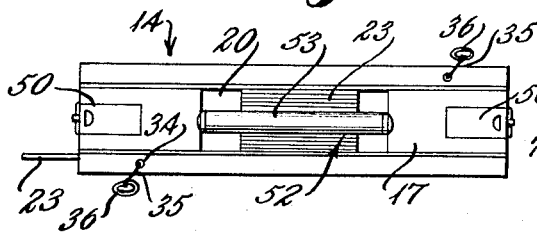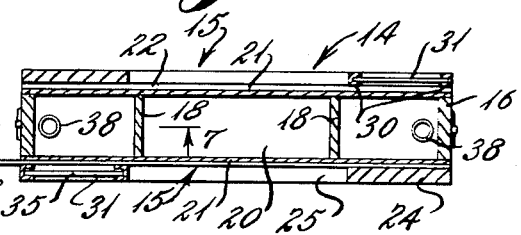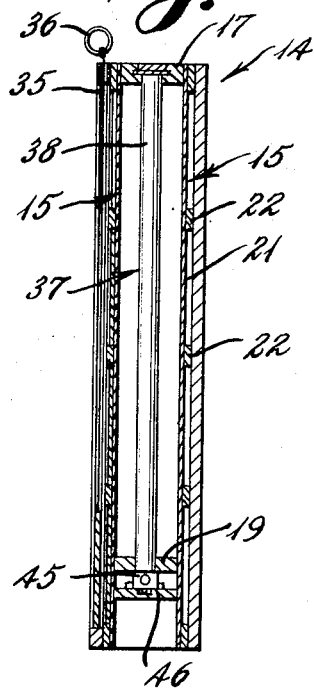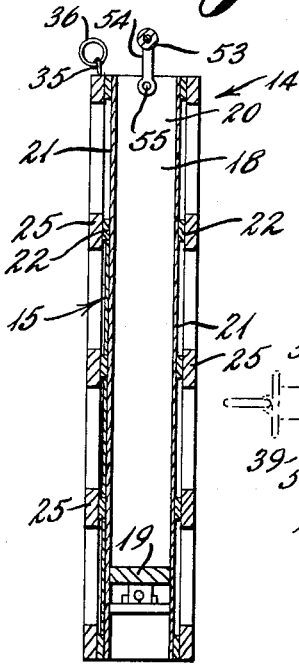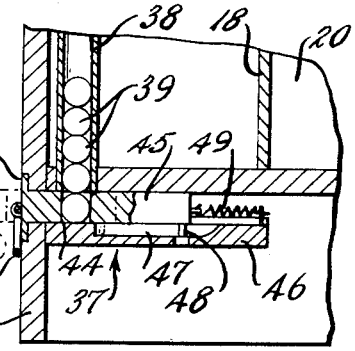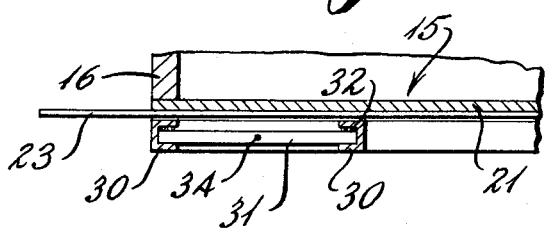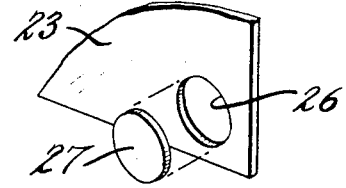
INVENTOR
JEAN FERGUSON

TEACHING AID FOR RETARDED CHILDREN

BACKGROUND OF THE INVENTION

1. Field of the Invention

This application relates generally to educational teaching aids and relates specifically to teaching educatable mentally retarded children by the use of word association with pictures to aid word recognition and to the dispensing of rewards for progress in learning in order to keep the attention of mentally retarded students over a longer period of time.

2. Description of the Prior Art

Heretofore most educational processes, apparatus, and aids have been geared to students having average, below average, or above average learning capacities, while exceptional students have advanced beyond their years and mentally retarded students having a short interest span have fallen by the wayside. Since most mentally retarded students are merely retarded and are not incapable of learning, some efforts have been made to educate them by providing special classes under the supervision of specially trained teachers. It has been found that one of the primary reasons why so-called "slow" students have not learned more rapidly is due to an interest span of short duration after which the student's mind refuses to accept additional knowledge.

Some efforts have been made to provide teaching apparatus for slow or retarded students; however, these devices have failed to retain the student's interest for substantial periods of time and, therefore, even though they have helped the student to some degree, they have not been entirely satisfactory for educating the student to his full capacity for learning. Also, these prior art devices have been complicated, expensive and have failed to make any significant advance in the student's learning rate.

SUMMARY OF THE INVENTION

The present invention is an apparatus to aid in teaching educatable mentally retarded students by substantially increasing the interest span of the student. This is done by actively involving the student in the operation of the apparatus and dispensing a reward when the student in correct. Also after the student has collected his reward, he is permitted to continue and to earn additional rewards as long as he gives correct answers. The apparatus includes a plurality of word and picture association cards with a student operated indicator by means of which the student selects a card either of his own volition or because of instructions from the teacher. If the student correctly associates the word and the picture, he is rewarded and permitted to continue.

It is an object of the invention to provide a relatively simple aid for teaching retarded children which increases the child's attentiveness and concentration by actively involving the child and offering a reward for correct answers.

Another object of the invention is to provide an aid for teaching retarded children in which a plurality of indicia bearing cards are movably and replaceably mounted on the apparatus and at least one reward dispensing mechanism is provided by means of which a child will be rewarded for a correct answer.

BRIEF DESCRIPTION OF THE DRAWINGS

FIG. 1 is a perspective of the preferred embodiment of the teaching apparatus.

FIG. 2 is a perspective of a carrying case for the apparatus shown in FIG. 1.

FIG. 3 is a top plan view of the preferred embodiment.

FIG. 4 is a section along the line 4—4 of FIG. 1.

FIG. 5 is a section along the line 5—5 of FIG. 1.

FIG. 6 is a section along the line 6—6 of FIG. 1.

FIG. 7 is an enlarged fragmentary section of the dispenser apparatus along line 7—7 of FIG. 4.

FIG. 8 is an enlarged fragmentary section showing the guideways for the indicator along line 8—8 of FIG. 1.

FIG. 9 illustrates different types of indicia bearing cards according to the invention.

FIG. 10 is an enlarged fragmentary perspective of one corner of a card illustrating a recess with a token therein.

DESCRIPTION OF THE PREFERRED EMBODIMENTS

With reference to the drawings, the present invention includes a generally rectangular box 14 constructed of wood, plastic or similar material and having substantially identical front and back walls 15 connected together by side walls 16 and top walls 17. A pair of generally vertical inside walls of partitions 18 and a recessed generally horizontal lower wall or partition 19 (shown in FIG. 5) define an inner storage compartment 20.

With reference to FIGS. 1, 4 and 6, the front and back walls 15 include thin backing panels 21 over which are attached a plurality of equally spaced horizontal track-forming strips 22. An indicia bearing card 23 is slidably mounted on each strip 22 except the top one. A relatively wide vertically disposed cover panel 24 is fixed over a portion of the horizontal track-forming strips 22 to mask a portion of each card. As illustrated, the cover panel 24 is located along the right side of the front and back walls 15. A retainer 25 is fixed to the central portion of each strip 22. Such retainer is wider than the strip and overlies the upper and lower edges thereof to hold the card 23 behind the retainer. As illustrated in FIGS. 9 and 10, each of the indicia bearing cards 23 includes a recess or receptacle 26 located adjacent to one end and such recess snugly receives a token 27 which can be removed by a student for a purpose to be described later.

A pair of vertically extending generally parallel channel members 30 are fixed to the outer surface of the strips 22 at one side of the box 14. These channel members face toward each other and form a guideway for a vertically movable indicator 31. As illustrated in FIG. 8, felt or other relatively soft strips 32 may be attached to one or more of the inner walls of each of the channel members 30 to provide frictional support for the indicator 31. Upper and lower stop members 33 are located at opposite ends of the channel members 30 to limit vertical movement of the indicator 31 and prevent the removal of such indicator from the channel members. In order to move the indicator 31 along the channel members 30, an opening 34 extends through the upper stop member to provide a passageway for a pull string 35 which is attached to the indicator at one end and to a ring pull handle 36 at the other end.

It is desirable to provide a reward for a correct answer to increase the student's interest and concentration. In order to do this, one or more dispensers 37 are located within the box 14. As illustrated in FIGS. 5 and 7, each dispenser includes a vertical supply cylinder 38 which holds a multiplicity of separate objects, such as pieces of candy 39. The upper end of each supply cylinder extends into a suitable opening in the top walls 17 and the lower end thereof extends through the lower partition 19.

The upper end of each cylinder may be closed in any desired manner, such as a plug or the like, or, as illustrated, by a flat rectangular plate which slidably fits into a cutout area in the top wall 17.

The lower end of the supply cylinder is open and discharges objects into an opening 44 extending through a drawer 45. Such drawer rests on a bottom block 46 having an elongated slot 47 adapted to receive a lug 48 carried by the bottom surface of the drawer. A spring or other resilient member 49 is attached to the inner end of the drawer and is anchored to the block 46. A ring pull handle 50 and stop plate 51 are attached to the outer end of the drawer. When the drawer is pulled outwardly, the lug 48 will contact the front wall of the slot 47 and limit outward movement of the drawer 45 at which time the opening 44 is disposed entirely outside the side wall 16 so that a piece of candy 39 will fall by gravity from the opening 44. The spring will return the drawer inwardly until the stop plate 51 engages the side wall 16 at which time the opening 44 will be in registration with the supply cylinder 38 so that another piece of candy will gravitate into the opening 44. Each time the drawer is pulled outwardly, a single piece of candy is discharged.

With reference to FIG. 9, the indicia bearing card 23 which is designed for use with the box just described may be constructed of plastic, cardboard or other material and is generally flat and rectangular. Preferably, each card has several words and/or pictures printed on its face and usually the indicia at one end of the card is indicative of a correct answer. As shown in FIG. 1, the card is long enough so that when it is in position on one of the track-forming strips 22 of the box, a portion of the card projects outwardly beyond the edge of the box and is readily grasped. The opposite end portion of the card normally is masked by the cover panel 24 so that the indicia thereon will be hidden until the student has answered, after which the card may be moved in either direction to reveal the hidden indicia by partially withdrawing such card or by inserting it further.

FIG. 9 illustrates several embodiments of indicia bearing cards in which the indicia on the cards include categories of spacial, relationship and functional words although these are merely examples of satisfactory indicia which could be used. If a student were working with the first embodiment a, the owl and the word "downward" on the righthand side of the card would be covered by the panel 24 and the three different owls on the left would be exposed to view. The student would be asked by the teacher to point to the picture which means "downward." Exposure of the hidden portion of the card would reveal the correct answer. Similarly for the second embodiment b the student would be asked to choose and say which word matches the picture and then the correct answer would be revealed. In the last embodiment the student would be required to read the word, tell what it means, and would confirm a correct reading by uncovering the picture and word of the object.

Since the box 14 is relatively small and portable, a handle 52 of any desired configuration is provided for carrying such box. As illustrated in FIGS. 1 and 6, the handle includes a generally rigid central portion 53 pivotally connected to links 54 which in turn are swingably mounted on pins 55 carried by the partitions 18. It is noted, however, that the handle could be constructed of flexible straps or other conventional handle-forming means.

The entire teaching apparatus including the box and the indicia bearing cards may be placed within a carrying case 56 such as that illustrated in FIG. 2 to protect the same during transportation and when not in use. The carrying case forms a jacket over the box and has top closure flaps 57 having slots 58 through which the handle 52 projects.

In the operation of the apparatus, indicia bearing cards 23, which normally are stored within the compartment 20, are placed on the track-forming strips 22 so that the righthand end portion of each card is masked. The indicator 31 is pushed down to a bottom position in the channels 30. The student is asked a question relative to the visible indicia on the card opposite the indicator 31. Following the student's response, the teacher or the student moves the card to reveal the correct answer. If the student's answer is correct, he removes the token 27 from the recess 26 on the card 23. The student then is permitted to pull the string 35 to move the indicator up to the next card. This process repeats itself until the student gives an incorrect answer or until the end of a day's lesson. Following the lesson the student returns his accumulated tokens to the teacher and operates the dispenser drawer 45 once for each token returned. Thus he is repeatedly rewarded for his learning successes by being permitted to advance the indicator vertically, to remove tokens from the card recesses, and to exchange tokens for edible objects.

It is contemplated that the student could redeem his tokens immediately or, if desired, the tokens could be omitted and the candy placed directly in the pockets 26.

In order to help focus attention, the box apparatus may be painted in dull or neutral shades which contrast with the bright coloring on the indicia bearing cards.

This teaching technique and apparatus have proved particularly successful with mentally retarded children. However, the apparatus can readily be adapted to different levels and types of students by variation in the difficulty of material printed on the indicia bearing cards.

I claim:

1. A teaching aid for instructing retarded children, said aid comprising a box, a plurality of guideways mounted on said box, an indicia bearing card slidably and replaceably mounted in each of said guideways, means for masking a portion of the indicia on each of said cards, indicating means selectively adjustably mounted on said box in a position to indicate a selected card, means for operating said indicating means, reward dispensing means located within said box, and means for selectively operating said dispensing means to dispense a reward for correctly identifying the indicia on at least one of said cards.

2. The structure of claim 1 in which said reward dispensing means includes a supply cylinder for receiving a plurality of rewards, a drawer having an opening therethrough slidably mounted below said supply cylinder, the opening in said drawer being in registration with said cylinder when the drawer is retracted and in a position to receive a reward from said cylinder, handle means for moving said drawer in a direction normal to the axis of said cylinder, whereby the reward in said opening will be dispensed.

3. The structure of claim 1 in which each of said cards includes token means which can be removed and redeemed for a reward.

4. The structure of claim 1 in which said box includes a storage compartment adapted to receive a multiplicity of cards when the cards are not in use.

5. A teaching aid comprising a box having spaced front and rear walls, each of said walls having a plurality of horizontally disposed guideways extending entirely across the same, a plurality of indicia bearing cards slidably mounted in said guideways, a masking panel located at one end of said guideways and adapted to mask a portion of each of said cards, a pair of opposed generally vertical channel members mounted on said guideways in spaced relation to said masking panel, an indicator slidably mounted in said channel members and selectively movable to a position generally in alignment with each of said cards, means for moving said indicator, at least one reward dispensing means located between said front and rear walls and including a supply cylinder for receiving a plurality of rewards, a slide member located below said supply cylinder, said slide member having an opening for receiving a reward from said cylinder when the cylinder and opening are in registration, and means for moving said slide member in a direction normal to said supply cylinder so that the slide member will dispense the reward in said opening and will prevent additional rewards from being dispensed until the slide member returns to its initial position.

* * * * *